United States Patent Office 3,508,729
Patented Apr. 28, 1970

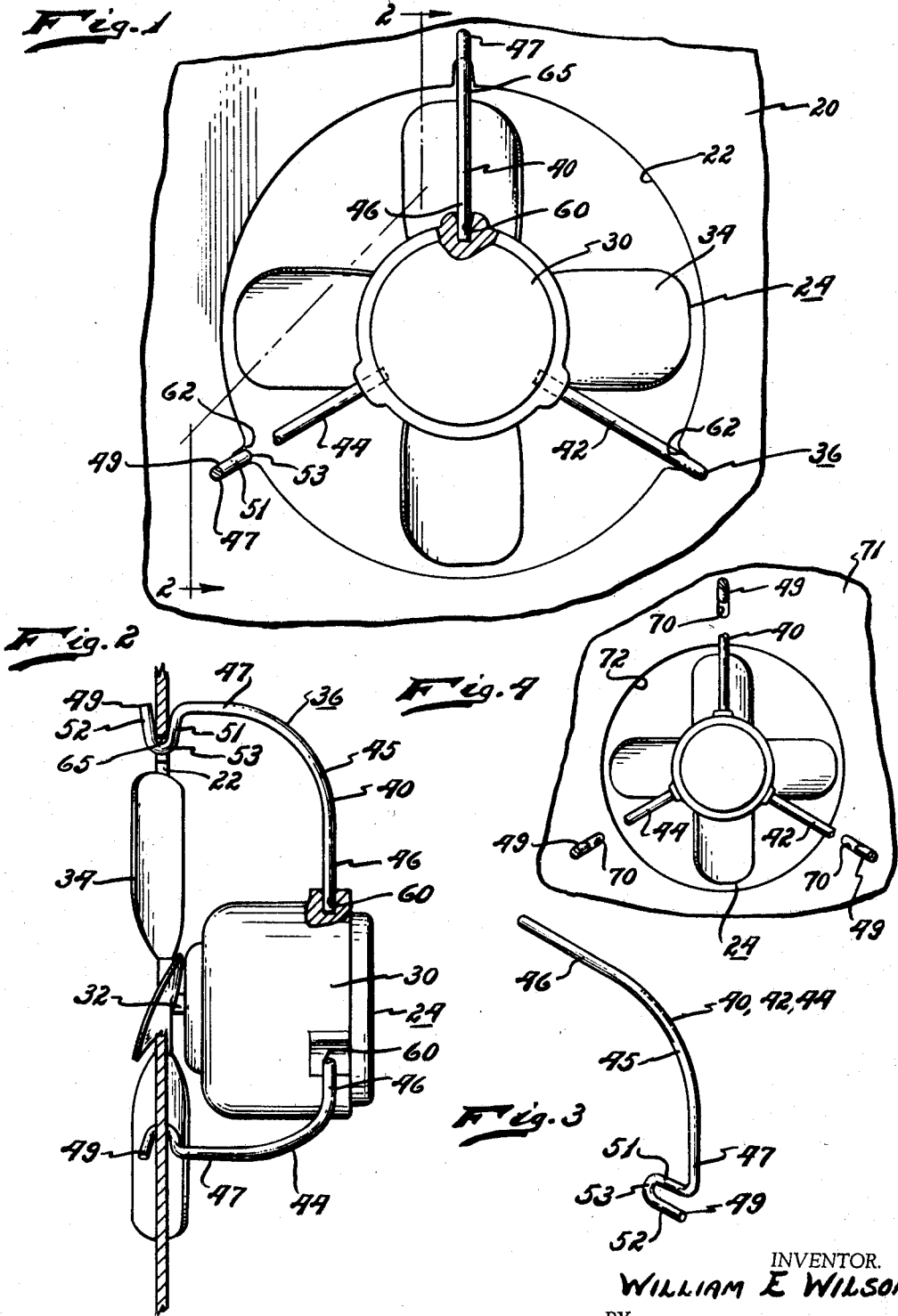

3,508,729
MOUNT FOR A MOTOR AND FAN UNIT
William E. Wilson, Detroit, Mich., assignor, by mesne assignments, to Kelvinator, Inc., Cleveland, Ohio, a corporation of Delaware
Filed Apr. 22, 1968, Ser. No. 723,109
Int. Cl. F04d 29/60
U.S. Cl. 248—26
5 Claims

ABSTRACT OF THE DISCLOSURE

A mounting comprising individual wire members of resilient material spaced about and radially extended from a motor of a motor and fan assembly unit. The wire members are assembled by inserting one end into a respective opening formed in spaced apart relation in the motor body and the opposite end being in yielding engagement against the edge of the wall opening in which the unit is disposed for operation.

---

This invention relates to a mounting for a motor and more particularly to a mounting arrangement for a motor and fan unit operative in or relative to an opening in a partitioned wall member.

The present invention provides a novel mounting for a motor and fan unit in a panel opening which allows the motor to be mounted for resilient movement to reduce the conduction of vibration and resonance from the motor to the panel while maintaining the unit centered within the opening. Another feature of the invention is that the mounting is done by a plurality of flexible resilient legs extending radially and arcuately from the rear of the motor toward the periphery of the panel opening where they engage radially extending notches or recesses either at or near the panel opening. The resilient legs are formed with re-entrant hook portions on their ends, and by the flexing of the legs the hook portions engage the notches or recesses in the panel and by the resilient outward deflection grip the panel to hold the motor in position.

Preferably, the resilient legs are inserted in sockets in the motor housing to project in cantilever fashion radially therefrom and for simplicity are identical in shape. In order to accommodate the fact that the lower legs support the weight of the motor and fan unit while the upper legs do not, the notches or recesses in the panel may be spaced at different distances from the center of the opening to accommodate the differential deflections of the legs under the loading from the weight of the motor fan unit for proper centering of the motor fan unit within the opening.

The above and other objects of the invention will appear from the following and more detailed description and from the drawings wherein:

FIG. 1 is an end view of a motor and fan unit embodying the present invention in the support of the unit from a wall member in an opening formed therein with parts broken away and parts shown in section;

FIG. 2 is a section taken substantially along line 2—2 of FIG. 1;

FIG. 3 is a perspective view of a wire support member of my invention, and

FIG. 4 is a reduced end view similar to FIG. 1 illustrating a modified form of the present invention.

Referring to the drawing, a partitioned wall member or panel 20 is shown with an opening or aperature 22 in which is mounted a motor and fan unit 24 for moving air therethrough.

The motor and fan unit 24 comprises an electric motor 30 having a shaft 32 upon which is rotatably secured a fan 34. The fan 34 is centered within the opening 22.

The motor and fan unit 24 is supported from the partitioned wall member 20 by my mounting arrangement, designated in general by the numeral 36 and comprises a plurality of wire members 40, 42, 44 of resilient material.

Each of the wire members 40, 42, 44 is performed with intermediate arcuate section 45 having one end 46 extended and terminating in a linear direction at approximately right angles to the direction of the opposite terminable end 47. The end 47 is formed with a hook 49 comprising an inwardly turned section 51 and a reversely extended section 52 spaced therefrom and connected by a bight section 53. The hook 49 opens outwardly to the circumference of the formed wire.

Spaced circumferentially about in the body of the motor 30 is a plurality of holes 60 extending a predetermined distance radially inwardly.

The wire members are first pre-assembled to the motor 30. The straight end 46 of each wire member is slidingly inserted by hand into a respective hole 60 which is drilled to receive the wire in a relatively snug interfit. With the unit 24 disposed in the opening 22 each wire member is positioned to extend towards the opening radially from the motor and the opposite hook end 49 of each wire member is moved to engage over the edge of the opening 22. Each hook 49 is received to extend laterally outwardly across the marginal top and bottom surfaces of the wall member adjacent the opening 22. By the resiliency of the wire member the bight section 53 is held in yielding engagement against the edge of the opening 22.

To prevent interference with the rotating fan blades each hook 49 is preferably received in a recess 62 extending inwardly from the periphery of the opening 22. Each recess 62 is radially aligned opposite a respective hole 60. Besides maintaining the wire members in radial alignment by preventing creeping of the wire members about the opening it also serves to prevent a self rotation of the unit that might be induced by its operation.

In mounting the motor 30 horizontally so as to be perpendicular to a vertical wall member as shown in the drawing, it is essential that the wire members be symmetrically arranged to support the unit 24 whereby at least two will bear equally the gravitational weight of the unit with a third wire member serving to prevent tilting action. In this arrangement one wire member, as 40, extends in a vertical position upwardly from the motor with the other two wire members 42, 44 supporting from below and being extended at an angle outwardly downwardly in opposed direction from the motor. As the tension of each wire member is substantially similar it is essential to reduce that of the vertical wire member 40 by extending its engagement into an extended or deeper recess 65. By extending the recess 65 over that of the other recesses 62 the wire member 40 is flexed to a lesser degree over that of the other members which reduces its tensional force sufficiently so as not to pressure the unit downwardly but still be effective to cooperatively assist in holding the unit so that the fan is properly centered within the opening 22.

In FIG. 4 elongated apertures or slots 70 are substituted for the recesses 62, 65 to receive the hook end 49 of a respective wire member. The slots for apertures 70 are arranged in the marginal section of the panel 71 a distance from and about the opening 72 in which is disposed the motor and fan unit 24. The slots 70 are similarly arranged relative to the unit 24 as described for the recesses and where necessary at least one of the slots being a further radial distance from the center of the opening 72 than are the others.

Though there is shown and described a symmetrical arrangement of three wire members to support the unit, it will be readily apparent that any further number may be used.

From the foregoing it will be appreciated that there has been described a mounting which provides a durable and economical support having a minimum of parts. Further, there is a minimum of contact between the base wall and wire members, and wire members and unit whereby resonance and vibration are reduced to a minimum without the need of rubber insulators and the like therebetween.

Although the invention has been described in its preferred form, it is understood that the present disclosure has been made only by way of example and that numerous changes in the details of construction and the combination and arrangement of parts may be resorted to without departing from the spirit and scope of the invention.

I claim:

1. A support for a motor and fan unit for resiliently mounting said motor and fan unit in a panel having an opening formed therein, the axis of rotation of said fan and motor substantially in alignment with the center of said opening, comprising said panel being formed with a plurality of radially extending recesses adjacent said opening and spaced substantially equidistantly therearound, a plurality of resilient legs equal in number to said panel recesses secured to said motor at the end of said motor away from said fan, said legs initially extending radially outward from said motor in a plane substantially parallel to said panel, the outer ends of said legs being arcuately curved toward said panel and said recesses, the ends of said legs being formed with hook portions opening radially outwardly for engagement with said recesses whereby upon engagement of all of said hook portions with all of said recesses, the resilient legs are stressed radially inwardly, said hook portions being formed with substantially parallel sides adapted to engage opposite sides of said panel to prevent axial movement of said motor and fan unit with respect to said panel, said parallel sides being joined together by a bight portion engaging said recesses to radially position said unit in said opening.

2. A support for a motor and fan unit for resiliently mounting said motor and fan unit in a panel having an opening formed therein, the axis of rotation of said fan and motor substantially in alignment with the center of said opening, comprising said panel being formed with a plurality of radially extending recesses adjacent said opening and spaced substantially equidistantly therearound, said motor having a frame, a plurality of radial sockets equal in number to said panel recesses in said frame at the end of said motor away from said fan, a plurality of resilient legs, each leg having an end portion received in a socket, said legs initially extending radially outward from said motor in a plane substantially parallel to said panel, the outer ends of said legs being arcuately curved toward said panel and said recesses, the ends of said legs being formed with hook portions opening radially outwardly for engagement with said recesses whereby the engagement of all of said hook portions with all of said recesses causes a radially inward deflection of all of said legs to support said unit on said panel.

3. A support for a motor and fan unit as set forth in claim 2 wherein said resilient legs are formed from round wire of uniform diameter.

4. A support for a motor and fan unit as set forth in claim 3 wherein said hook portions on said resilient legs are formed with substantially parallel sides adapted to engage opposite sides of said panel to prevent axial movement of said motor and fan unit with respect to said panel, and said parallel sides are joined together by a bight portion engaging said recesses to radially position said unit in said opening.

5. A support for a motor and fan unit as set forth in claim 3 wherein at least one of said recesses has a different radial spacing from the center of said panel opening than the remainder of said recesses to provide uniform flexing of said legs under the additional force imparted to said legs by the weight of said motor and fan unit.

References Cited

UNITED STATES PATENTS

| | | | |
|---|---|---|---|
| 1,786,203 | 12/1930 | Gilbert | 248—26 X |
| 2,096,621 | 10/1937 | Skolfield | 230—273 |
| 2,580,313 | 12/1951 | Morrill | 248—26 |

FOREIGN PATENTS 494,973  11/1938  Great Britain.

ROY D. FRAZIER, Primary Examiner

J. F. FOSS, Assistant Examiner

U.S. Cl. X.R.

230—273; 248—15, 27; 310—91